US011948420B2

(12) United States Patent
Barbour et al.

(10) Patent No.: US 11,948,420 B2
(45) Date of Patent: Apr. 2, 2024

(54) RECONFIGURABLE CHAIR-BASED ELECTRONIC GAMING MACHINES AND METHODS

(71) Applicant: ARISTOCRAT TECHNOLOGIES AUSTRALIA PTY LIMITED, North Ryde (AU)

(72) Inventors: Timothy Francis Barbour, Las Vegas, NV (US); Linn Anthony McKay, Las Vegas, NV (US); Rajendrasinh Banesinh Jadeja, Las Vegas, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 316 days.

(21) Appl. No.: 17/184,384

(22) Filed: Feb. 24, 2021

(65) Prior Publication Data

US 2021/0183202 A1 Jun. 17, 2021

Related U.S. Application Data

(63) Continuation of application No. 15/956,886, filed on Apr. 19, 2018, now Pat. No. 10,957,148.

(60) Provisional application No. 62/556,058, filed on Sep. 8, 2017.

(51) Int. Cl.
*G07F 17/32* (2006.01)

(52) U.S. Cl.
CPC ...... *G07F 17/3216* (2013.01); *G07F 17/3209* (2013.01); *G07F 17/3211* (2013.01)

(58) Field of Classification Search
CPC ............. G07F 17/3209; G07F 17/3211; G07F 17/3216
See application file for complete search history.

(56) References Cited

U.S. PATENT DOCUMENTS

| | | | | |
|---|---|---|---|---|
| 6,347,999 | B1 | 2/2002 | Yuan | |
| 6,530,842 | B1 | 3/2003 | Wells | |
| 8,262,478 | B2 | 9/2012 | Pryzby | |
| 8,663,019 | B2 | 3/2014 | Lesley | |
| 8,858,343 | B2 | 10/2014 | Filipour | |
| 9,943,174 | B1 * | 4/2018 | Jacobs | A61H 9/0078 |
| 2004/0254020 | A1 | 12/2004 | Dragusin | |
| 2006/0014586 | A1 | 1/2006 | Gatto | |
| 2007/0099708 | A1 | 5/2007 | Okada | |
| 2008/0054561 | A1 | 3/2008 | Canterbury | |
| 2009/0054121 | A1 | 2/2009 | Saito | |

(Continued)

OTHER PUBLICATIONS

Australian Examination Report No. 1 for App. No. AU2020203939, dated May 27, 2021, 7 pages.

(Continued)

*Primary Examiner* — James S. McClellan
*Assistant Examiner* — Ross A Williams
(74) *Attorney, Agent, or Firm* — Armstrong Teasdale LLP

(57) ABSTRACT

Gaming machines, methods, and systems include gaming chairs integrated with player interface hardware elements in a chair structure and in communication with a game controller. The gaming chairs allow modular assembly and reconfigurability of gaming machines and systems without customized gaming machine cabinetry. Modular pedestals and secondary gaming elements supported on the pedestals may also be provided in combination with the gaming chairs for assembly into different game bank configurations.

19 Claims, 16 Drawing Sheets

(56) References Cited

U.S. PATENT DOCUMENTS

| | | | | |
|---|---|---|---|---|
| 2009/0054137 | A1 | 2/2009 | Toyoda | |
| 2009/0138133 | A1 | 5/2009 | Buchholz | |
| 2009/0187125 | A1 | 7/2009 | Tran | |
| 2009/0209342 | A1 | 8/2009 | Okada | |
| 2009/0233669 | A1 | 9/2009 | Okada | |
| 2011/0003631 | A1 * | 1/2011 | Tastad | G07F 17/3216 463/47 |
| 2011/0109134 | A1 | 5/2011 | Filipour | |
| 2011/0111847 | A1 | 5/2011 | Lesley | |
| 2012/0282997 | A1 | 11/2012 | Miner | |
| 2012/0302323 | A1 | 11/2012 | Gagner | |
| 2012/0322564 | A1 | 12/2012 | Granger | |
| 2013/0005442 | A1 * | 1/2013 | Erickson | G07F 17/3216 463/25 |
| 2013/0137524 | A1 | 5/2013 | Scott | |
| 2015/0287272 | A1 | 10/2015 | Surmacz | |
| 2018/0040203 | A1 | 2/2018 | Winters | |
| 2018/0240297 | A1 | 8/2018 | Czubak | |

OTHER PUBLICATIONS

AU Examination Report for AU Application No. 2019204515, dated Jun. 14, 2019. 9 Pages.

Office Action dated Jul. 24, 2020 for U.S. Appl. No. 15/956,886 (pp. 1-13).

Notice of Allowance dated Jan. 27, 2021 for U.S. Appl. No. 15/956,886 (pp. 1-7).

* cited by examiner

RECONFIGURABLE CHAIR-BASED ELECTRONIC GAMING MACHINES AND METHODS

CROSS REFERENCE TO RELATED APPLICATIONS

This application is a continuation of, and claims priority to, U.S. patent application Ser. No. 15/956,886, filed Apr. 19, 2018, which claims the benefit of U.S. Provisional Application Ser. No. 62/556,058 filed Sep. 8, 2017, the complete disclosures of which are hereby incorporated by reference in their entireties.

BACKGROUND OF THE INVENTION

The embodiments described herein relate generally to electronic gaming machines and, more particularly, to gaming machines, systems, and methods including gaming machine hardware integrated into a gaming chair for enhanced game presentation and configurability on a game floor.

A conventional gaming machine typically includes a cabinet, one or more game displays mounted to the cabinet, and a player interface supported on the cabinet. Using the player interface, a player can make wagers, enable pay lines, cash-out accumulated credits, prompt a play of the game or make inter-game selections in a game of chance. Accordingly, the player interface typically includes a bill/card/voucher acceptor for accepting and/or validating cash bills, coupons, and ticket vouchers in order to play the game. These bill/card/voucher acceptors may also be enabled to accept player identification cards used in rewards/loyalty programs through which players are enrolled to obtain promotions. These promotions may be things such as gifts, meals or cash back to the player based upon the player's wagering activities tracked via presentment of the player identification card. The player interface may also include a credit or cash-out element for the player to collect any winnings from games played.

Conventional cabinet designs for electronic gaming machines are problematic in some aspects. Improvements are accordingly desired.

SUMMARY OF THE INVENTION

Embodiments are described herein providing a gaming chair including a chair structure comprising a base, a seat supported by the base, at least one arm rest, and a backrest. A game controller is located inside the base and below the seat, and a plurality of player interface hardware elements are incorporated into the at least one arm rest or the backrest, wherein the plurality of player interface hardware elements is selected from the group of: a speaker, a video display, an input/output element, a card and/or ticket reader, a printer, a bill acceptor and/or coin input mechanism, and a coin or token output mechanism.

Optionally, in further embodiments of a gaming chair, the at least one arm rest may include the card and/or ticket reader. The at least one arm rest may also include at least one mechanical pushbutton. The gaming machine may further include a video display mounted to the at least one arm rest, and the video display may be a touch screen. The at least one arm rest may be rotatably mounted to the backrest, and the at least one input/output element may be integrated in the rotatably mounted arm rest.

In additional embodiments of a gaming chair, a local power supply may also be inside the base of the chair structure. A video display may be integrated into the backrest. The game controller may include a processor that executes game instructions in accordance with game play rules and outputs game play options. A game deck optionally be provided, and the chair base may be rotatably mounted to the game deck and may be selectively positionable relative to the game deck between a game play position enclosing the game controller and a service position providing access to the game controller. The gaming chair may also be provided in combination with at least one secondary gaming element selected from the group of: at least one main video display, a virtual reality component, an augmented reality component, a hologram component, a projector element or a slot machine reel.

Another embodiment described herein provides a gaming machine including at least one gaming chair having a chair structure including at least a base, a seat supported by the chair base, at least one arm rest, and a backrest. A plurality of player interface hardware elements are incorporated into the at least one arm rest or the backrest, wherein the plurality of player interface hardware elements is a combination of different interface hardware elements selected from the group of: a speaker, a video display, an input/output element, a card and/or ticket reader, a printer, a bill acceptor and/or coin input mechanism, and a coin or token output mechanism. The gaming machine also includes at least one game controller located inside the base and below the seat. The at least one game controller is in communication with the plurality of player interface hardware elements and operatively responsive to a player's interaction with the plurality of player interface hardware elements to execute game play instructions in accordance with game play rules and outputs game play outcomes. At least one secondary gaming element is separately provided from the gaming chair and is in communication with the game controller, with the at least one secondary gaming element being selected from the group of: a main video display, a virtual reality component, an augmented reality component, a hologram component, a projector element, or a slot machine reel.

A further embodiment of a gaming machine may also include at least one pedestal, with the pedestal supporting the at least one secondary gaming element in a spaced relation from the gaming chair. The at least one pedestal may support a plurality of secondary gaming elements. The secondary gaming elements may be main video displays. The gaming machine may also include a game deck, with the at least one gaming chair being selectively positionable relative to the game deck to provide service access to the game controller. A local power supply may also be inside the chair base to power the game controller, the plurality of player interface hardware elements, and the at least one secondary gaming element.

Another embodiment described herein provides a gaming system including a plurality of gaming chairs each having a chair structure including at least a base, a seat supported by the base, at least one arm rest, and a backrest. A plurality of player interface hardware elements are incorporated into the arm rest or the backrest and accessible by a player seated on the chair to provide a game play input, wherein the plurality of player interface hardware elements is selected from the group of: a speaker, a video display, an input/output element, a card and/or ticket reader, a printer, a bill acceptor and/or coin input mechanism, and a coin or token output mechanism. At least one game controller is inside the chair base of at least one of the plurality of gaming chairs. The at least one game controller is in communication with the plurality of player interface hardware elements and includes a processor that executes game play instructions in accordance with game play inputs, executes game play rules, and outputs game play outcomes. A plurality of secondary gaming elements are in communication with the at least one game controller, the plurality of secondary gaming elements being selected from the group of: a main video display, a virtual reality component, an augmented reality component, a hologram component, a projector element or a slot machine reel. The plurality of gaming chairs and the plurality of secondary gaming elements are provided as modular components for assembly into a plurality of different game bank configurations.

In a further embodiment of a gaming system, the plurality of secondary gaming elements are main video displays, and the system further includes at least one pedestal supporting the main video displays adjacent each respective one of the plurality of gaming chairs. The at least one pedestal may support multiple ones of the main video displays.

BRIEF DESCRIPTION OF THE DRAWINGS

Features and advantages of the present invention will become apparent from the following description of embodiments thereof, by way of example only, with reference to the accompanying drawings, in which.

Figure 1:
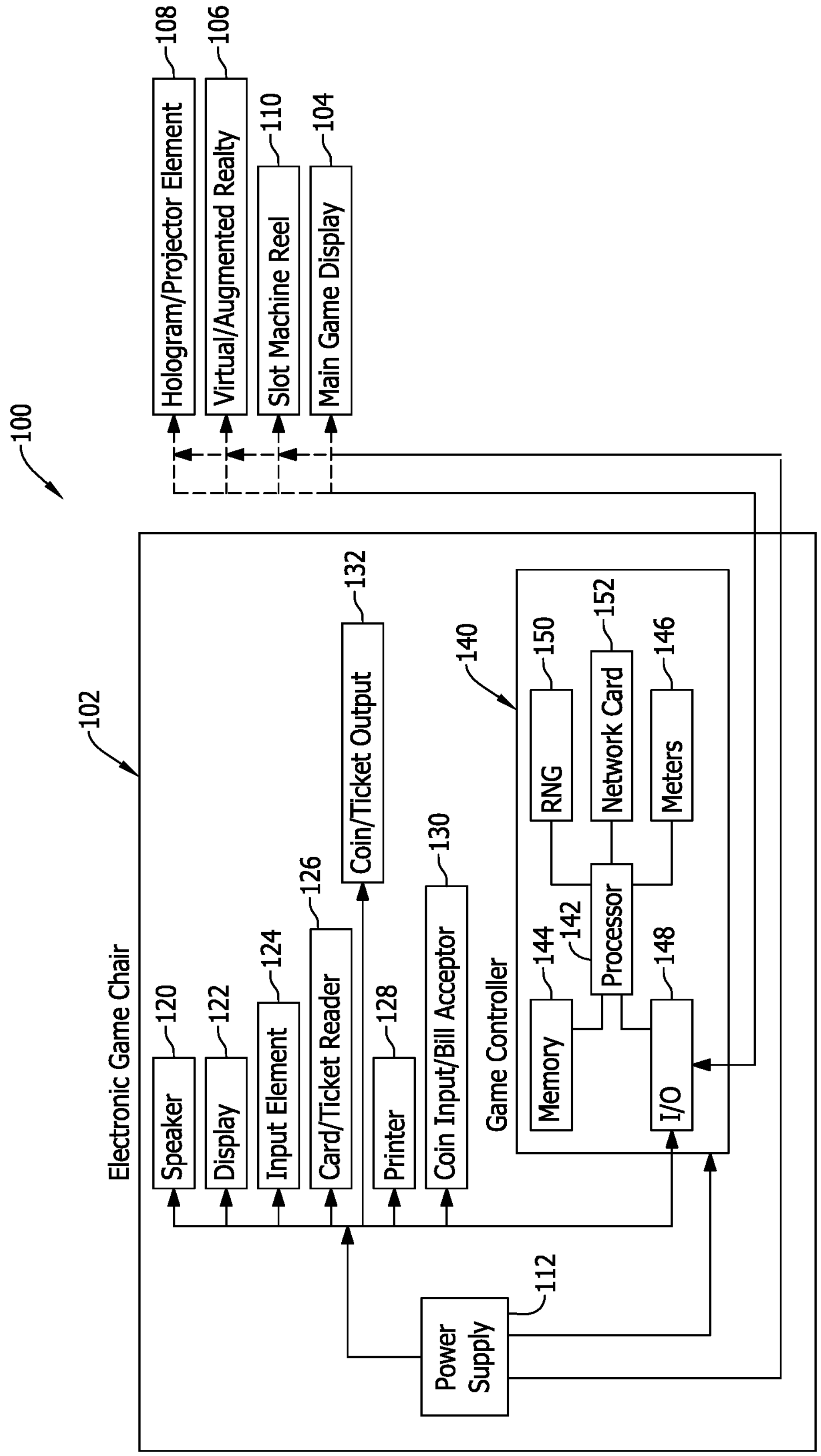
FIG. 1 schematically illustrates a first embodiment of an electronic gaming machine and system including player interface hardware components integrated in a gaming chair.

Further aspects of the present invention will be apparent from the following description, given by way of example and with reference to the accompanying drawings. Also, various embodiments of the aspects described in the preceding paragraphs will be apparent from the appended claims, the following description and/or the accompanying drawings. It should be understood, however, that the present invention is not limited to the arrangements and instrumentality shown in the attached drawings. Method aspects will be in part apparent from the figures and in part explicitly described in the following description.

DETAILED DESCRIPTION

With rapid advancements in video display technologies, modern gaming machines have a relatively short life span on the order of about two years before the displays become outdated. Conventional gaming machine cabinets are typically designed, however, with a specific video display or type of video display in mind. The video displays can be relatively large, and it can take up to 18 months to develop a cabinet to support the video displays and any necessary player interface hardware. Some customization in cabinets tends to be desirable for different games, such that from a manufacturer's perspective a large number of cabinet designs are typically designed to accommodate different games. Because of such customization, an existing cabinet generally may not quickly or easily be retrofit with a newer, state of the art display in order to refresh the machine. Consequently, new cabinets are typically developed for new and emerging display technologies, typically with substantial costs.

Conventional gaming machine cabinets also typically require custom signage and artwork that presents further costs to introducing a new game. The cabinet design and signage also present some inherent risk to a game introduction. If for whatever reason the signage and cabinet are not well received in a gaming community, players may choose not to play the game. Of course, it is sometimes difficult to predict whether a game cabinet design and signage will prove to be attractive (or not) to players in any given gaming community.

In addition to the issues above, custom cabinetry and signage of gaming machines presents certain limitations to using a gaming machine to a play a game other than the one for which it was designed. As such, many machines of this type are rather limited in their ability to allow a player to select one of multiple different games that may be played on the machine or to present different games on the same machine at different times.

In view of the above, a more universally applicable gaming machine design is desired that is more amenable to being configured for use with different games and different types of displays with reduced costs.

Embodiments are therefore described herein providing a gaming machine and system that does not include a conventional cabinet or the limitations of a cabinet in developing, presenting, configuring and re-configuring gaming machines to accommodate emerging technologies and to accommodate multiple games being played on the same machine. In lieu of a cabinet, gaming machines and systems of the invention include a local power supply unit, player interface hardware components, and game controller components that are generally self-contained in the structure of a gaming chair. As such, the gaming chair may function as a standalone gaming machine or as part of a gaming system in combination with a secondary gaming element such as a main display supported on a pedestal structure proximate the gaming chair. Other secondary gaming elements are also possible, such as slot machine reels, holographic projector elements, and augmented/virtual reality equipment.

The player interface hardware incorporated in the gaming chair may include a speaker, a video display, input elements such as mechanical buttons, a card/ticket reader, a printer, a coin input acceptor or bill acceptor, and a coin/token/cash out device. The player interface hardware may be provided in various combinations and may be distributed amongst various different structural elements of a gaming chair, including a chair base, a seat, a backrest, or arm rests. As such, a player sitting in the gaming chair may access the player interface hardware from a seated position using the hardware peripherals provided in the gaming chair. Enhanced game immersion and comfort is afforded to a player that is not presented by conventional gaming machine cabinet designs and conventional chairs. In some embodiments, a movable arm rest is provided to assist with ingress and egress to the gaming chair, and a pivotal gaming chair base may be provided that may house game controller components that can be easily accessed for service when needed by rotating the chair about a game deck to provide access to the game controller. The gaming chair may in some cases be a fully functional electronic gaming machine that requires no connection to other gaming components for a player to enjoy a game, or in other cases the gaming chair may be assembled with and connected to other gaming elements and gaming components to provide a gaming machine system.

In the case of the player interface hardware integrated into the gaming chair, a simpler and cleaner player interface is provided that is less expensive to develop and provide in comparison to a conventional, custom designed, gaming machine cabinet. By virtue of such a gaming chair, once initial regulatory approval of the gaming chair is obtained, game development time may be reduced from about 18 months to about 6 months since approved player interface hardware in the gaming chair is mostly unchanged to expedite the regulatory approval process in developing a new game. Also by virtue of such gaming chairs, new games may be developed at 50% to 75% of the cost of a conventional gaming machine including a customized gaming machine cabinet.

Gaming chairs may be provided in combination with a relatively simple pedestal structure to support a secondary structure such as a main game display. The pedestal structure is likewise less expensive to develop and provide in comparison to conventional, custom designed gaming machine cabinets. Beneficially, pedestals may be designed such that main displays or other gaming elements may be easily replaced and new types of displays or other gaming elements maybe easily accommodated in a retrofit manner when needed or as desired to effectively refresh the gaming machine when desired. Combinations of player interface hardware integrated into the pedestal and also the gaming chair are likewise possible at lower cost than conventional gaming machine cabinets. The game controller hardware may likewise be distributed amongst the pedestal and the gaming chair as desired.

Either the pedestal or the gaming chair may be provided at lower cost than conventional cabinets that integrate one or more game displays and player interface hardware in a highly customized manner. Instead of being designed around a specific type of display, as well as size and configuration of the display, the gaming chairs and pedestals are beneficially utilized with different types of displays and accommodate practically any type of display desired. The pedestal may further be designed to mount different types of video displays, may be made with emerging display technologies in mind, and/or may be easily replaced to accommodate new display technologies or other gaming elements. The gaming chair and/or pedestal may be provided for simple connection with one another or to a main display or other gaming element as a modular, plug-and-play type of system. Connections between the hardware components may be wired or wireless as desired.

Advantageously, the gaming chairs and pedestals may be provided as modular components that can be assembled into a variety of different game bank configurations in combination with a game deck to provide attractive game banks having different numbers of and gaming chairs different arrangements of gaming chairs around various different arrangements of pedestals and secondary gaming elements to provide further immersive game experiences and visually distinct game impressions. The pedestals likewise may accommodate different numbers of secondary gaming elements such as main video displays in locations corresponding to the gaming chairs provided. The various game bank configurations made possible by the modular gaming chairs require little to no signage relative to conventional gaming machine cabinets, as different games can easily be presented on the video displays associated with teach gaming chair, some of which may be integrated into the gaming chair design. The gaming chair and pedestals are easily used with multiple and different games, and gaming machines and systems, by virtue of the gaming chairs and pedestals, can be highly stylized at significantly lower costs than conventional cabinet designs.

FIG. 1 is a schematic block diagram of operative components of a gaming machine and system 100 that is integrated in or built-in to a gaming chair 102 that may be used either as a standalone gaming machine or in combination with additional secondary gaming elements. As shown in FIG. 1, such secondary gaming elements may include a main game display 104, a virtual/augmented reality element 106, a three dimensional hologram projector element 108, or a slot machine reel 110 in various, non-limiting examples. In some embodiments, more than one secondary gaming element may be provided with one gaming chair, such as two main game displays 104.

Unlike conventional gaming machines and systems that are built around a customized cabinet design, the system 100 is built around the gaming chair 102. That is, instead of building a customized cabinet to support the operative gaming elements, the operative gaming elements are instead integrated into the gaming chair 102. As such, the large and typically custom-designed cabinet of a conventional gaming machine may be eliminated in favor of the gaming chair 102 that can be designed and developed much more quickly and at lower cost. The gaming chair 102 may in some cases be a fully functional, standalone gaming machine including a complete player interface and game controls that do not require an secondary gaming elements to play a game, or the gaming chair 102 may be used in combination with secondary gaming elements 104, 106, 108 and/or 110 to define various different types of game machines and gaming systems in various different game bank configurations described below. The gaming chair 102 may be networked with a remote device that provides gaming instructions for multiple and different games that may be selectively presented to players at selected times or on demand once a player makes a game selection. The game selections may include games of skill or games of chance. The gaming chair 102 is sometimes referred to as a gambling chair for use in a licensed gaming facility, although in some aspects the invention is not necessarily limited to gambling and may instead be beneficially used for general purpose gaming in a commercial or residential environment.

The gaming chair 102 facilitates much flexibility and compatibility to complement various different types of secondary gaming elements 104, 106, 108 and/or 110. In the case of a secondary gaming element such as a main video display 104, the gaming chair 102 can be used easily with different types, different sizes and different configurations of video displays. Combinations of gaming chairs 102 and pedestals to support main video displays 104 can be easily configured into unique game bank configurations for enhanced game presentation and immersive game experience as further described below.

As shown in the example of FIG. 1, the gaming chair 102 includes a number of operative player interface hardware elements such as one or more speakers 120, one or more displays 122, one or more input elements 124, a card and/or ticket reader 126, a printer 128, a bill acceptor and/or coin input mechanism 130 and a coin or token output mechanism 132. Additional hardware, including but not limited to lighting elements, may be included as part of the gaming chair 102, or some of the hardware shown may be omitted based on the specific implementation. The player interface hardware elements shown may be integrated in a base of the gaming chair 102, a seat of the gaming chair 102, an arm rest of the gaming chair 102, a backrest of the gaming chair 102, or an appendage to the gaming chair 102 as shown and described in some of the examples below.

In the example shown in FIG. 1, the gaming chair 102 and/or the secondary gaming elements 104, 106, 108, 110 are in communication with a game controller 140 having a processor 142. Instructions and data to control operation of the processor 142 are stored in a memory 144, which is in data communication with the processor 142. The processor 142 executes game play instructions in accordance with game play rules and outputs game play outcomes. Typically, the game play instructions are stored as program code in a memory 144 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server. While one game controller 140 is shown, it is understood that multiple game controllers may be provided in concert with one another to coordinate the functions of the player interface elements in the game play.

Various types of control architectures may be implemented as desired. For example, a "thick client" architecture may be used wherein part of the game is executed on a processor device in the gaming chair and part of the game is executed remotely, such as by a gaming server. Alternatively, a "thin client" architecture may also be used wherein most of the game is executed remotely such as by a gaming server that is responsive to the player interface hardware provided on the gaming chair. Likewise, the control architecture may be fully integrated in the gaming chair such that a game is completely executed by the processor device in the gaming chair, although it may still be in communication with a remote server device to receive game instructions for different games or for other desirable purposes. Finally, the respective functions of the game controller 140 and any gaming server desired may be selectively modifiable. For example, the gaming chair may operate in standalone gaming machine mode, "thick client" mode or "thin client" mode depending on the game being played, operating conditions, and so on. Other variations will be apparent to persons skilled in the art.

Typically, the memory will include both volatile and non-volatile memory and more than one of each type of memory, with such memories being collectively represented by the memory 144. For example, the memory 144 may include flash memory (FLASH), random-access memory (RAM), erasable programmable read-only memory (EEPROM), and a mass storage device. The FLASH memory may include diagnostic code and the like. The RAM memory may temporarily hold program files for execution by the processor 142 and related data. The EEPROM memory may be a boot ROM device and/or may contain some system or game related code. The mass storage device may typically be used to store game programs, the integrity of which may be verified and/or authenticated by the processor 142 using protected code from the EEPROM memory or elsewhere.

The game controller 140 may also include hardware meters 146 for purposes including ensuring regulatory compliance and monitoring player credit, and an input/output (I/O) interface 148 for communicating with peripheral devices 120, 122, 124, 126, 128, 130, 132 of the gaming chair 102. The input/output interface 148 and/or the peripheral devices may be intelligent devices with their own memory for storing associated instructions and data for use with the input/output interface or the peripheral devices. A random number generator module 150 generates random numbers for use by the processor 142. Persons skilled in the art will appreciate that the reference to random number generators includes pseudo-random number generators.

A communications interface, for example a network card 152 may also be provided. The network card 152 may, for example, send status information, accounting information or other information to a central controller, server or database and receive data or commands from a central controller, server or database. As such, the gaming chair 102 and the secondary gaming elements 104, 106, 108, 110 may be used to present multiple and different games and provide substantially different gaming experiences while otherwise using the same hardware elements.

The secondary gaming elements 104, 106, 108, 110 may be powered by a power supply unit 112 provided in the gaming chair 102 as shown. The power supply unit 112 also powers the game controller 140 and the associated peripheral devices 120, 122, 124, 126, 128, 130, 132 of the gaming chair 102. The power supply 112 receives electrical power from an alternating current (AC) main power supply connection in a gaming facility, and distributes output power to the game controller 140 and the peripheral devices 120, 122, 124, 126, 128, 130, 132 of the gaming chair 102 at a specified, regulated AC or DC voltage. The power supply unit 112 may include power fail detection features, and in some cases may be an uninterruptible power supply unit. The power supply unit 112 may coordinate with the game controller 140 to save a state of one of the meters 146 in the event of a power loss from the main power supply. As such, the power supply unit 112 is sometimes referred to as a local power supply in the gaming chair 102 that facilitates local power fail support via non-volatile memory for desired peripheral devices and meter RAM via the game controller 140.

As shown in the further examples below, while the game controller 140 and elements 142, 144, 146, 148, 150, 152 are shown as part of the gaming chair 102, the game controller 140 and elements 142, 144, 146, 148, 150, 152 may likewise be separately provided as desired, but in another manner that does not require a conventional gaming machine cabinet. It is also possible for the operative components of the gaming machine or system 100 to be distributed amongst other structures instead of all being integrated into the gaming chair 102 shown in FIG. 1. Multiple game controllers are likewise possible that may communicate with another.

Figure 2:
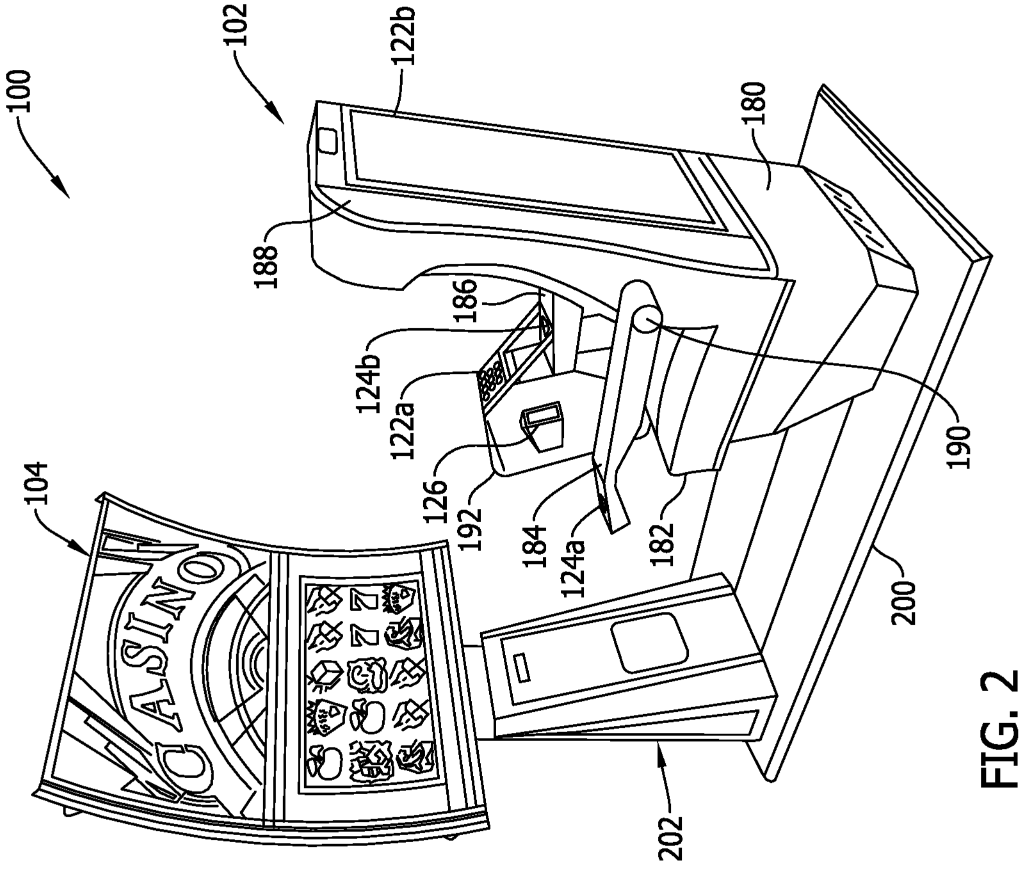
FIG. 2 is a first perspective view of an exemplary embodiment of the gaming machine and system shown in FIG. 1.
Figure 3:
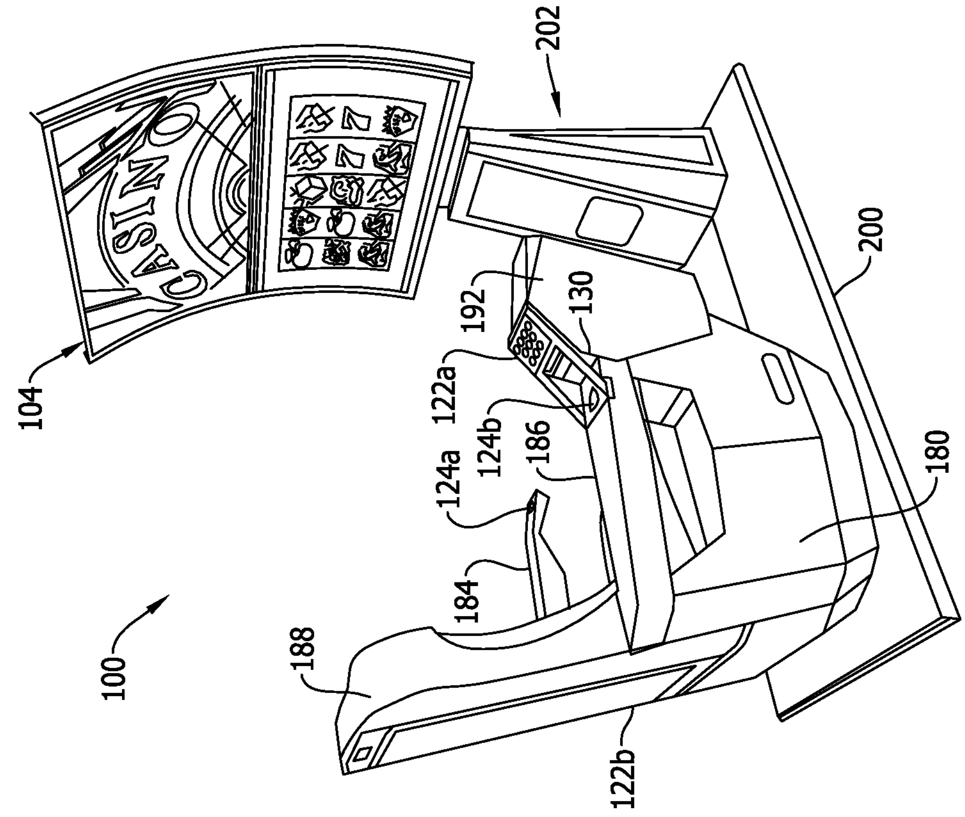
FIG. 3 is a second perspective view of the gaming machine and system shown in FIG. 2.
Figure 4:
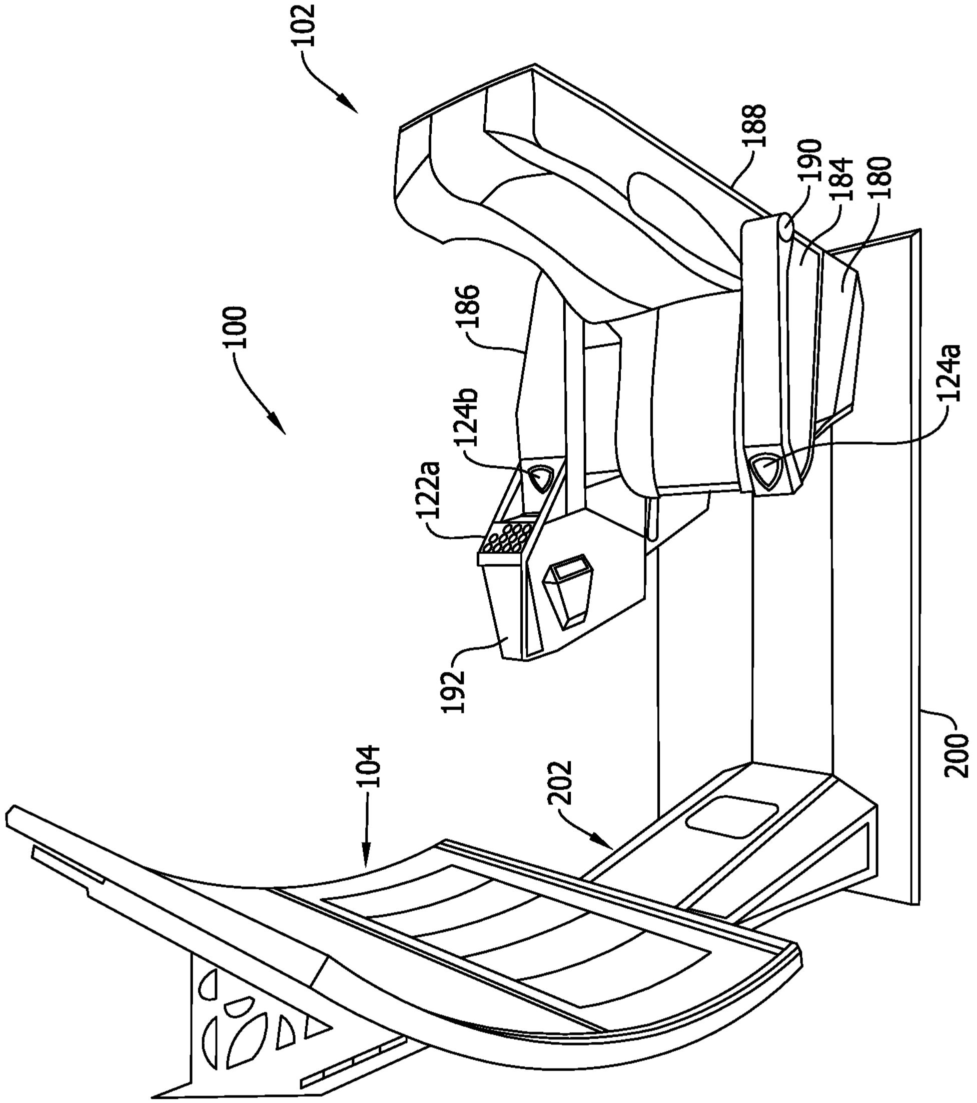
FIG. 4 is a third perspective view of the gaming machine and system shown in FIG. 2.

FIGS. 2 through 4 are perspective views of a first exemplary embodiment of a gaming chair 102 for the machine and system 100 shown in FIG. 1. The gaming chair 102 includes structural elements such as a base 180, a seat 182, opposing arm rests 184, 186 and a backrest 188. The structural elements 180, 182, 184, 186 and 188 may be fabricated from plastic, wood, metal or another suitable element. Seat cushions may be provided as shown. The backrest 188 may recline relative to the base 180 for increased comfort to a player. In the example shown, the gaming chair 102 is sized and dimensioned to seat a single person for game play, although in other embodiments gaming chairs 102 may alternatively be designed to accommodate more than one person.

The structure of the gaming chair 102 may include hollow sections, receptacles, cavities, etc. in the elements 180, 182, 184, 186 and 188 to house or support the peripheral player interface hardware devices shown in FIG. 1 in desired locations. Conduits, channels, and guides may also be provided in the gaming chair structure to allow for interconnection of peripheral devices and/or to facilitate communication with the game controller.

In the example of FIG. 2, the arm rest 184 is pivotally mounted to the backrest 188 and is rotatable about end 190 between a game play position shown in FIG. 2 with the arm rest extending substantially horizontally as shown and a vertical position (not shown) alongside the backrest 188 to provide unobstructed access to the seat 182 by the player. The arm rest 184 includes a first input/output element 124*a* extending on a distal end thereof in the form of a mechanical pushbutton. Other mechanical input elements may be provided in addition to or in lieu of the pushbutton shown, including but not limited to a joystick, a track ball, a mouse or another known input element to the art of gaming machines and systems. Regardless the input/output element 124*a* allows a player to make a game selection, initiate a game sequence, input a game command during a game sequence, or receive game feedback during game play. Haptic feedback elements and the like may be incorporated in the input/output element 124*a* or the gaming chair generally for enhanced game immersion and game functions to be enjoyed by a player seated on the gaming chair.

The arm rest 186 is generally fixed in position relative to the backrest 188 and includes an appendage 192 that includes the card/ticket reader 126 and 126 (or in a further embodiment the coin/bill acceptor 124) as shown. The appendage 192 may be removable or otherwise accessible via access doors and the like for service, for collection of coins/bills or tokens, or for other purposes as desired. The arm rest 186 includes a second input/output element in the form of a mechanical pushbutton 124*b* extending on a distal end thereof in the form of a mechanical pushbutton. While the input/output element 124*b* is shown as a pushbutton, other types of input/output elements, including but not necessarily limited to those discussed above, may be provided in further and/or alternatively embodiments of the invention for use by a player to make a game selection, initiate a game sequence, input a game command during a game sequence, or receive game feedback during game play. Haptic feedback elements and the like may be incorporated in the gaming chair and associated with the input/output element 124*b*.

The gaming chair 102 further includes a video display 122*a* coupled to the arm rest 186 on a support bracket as shown. In contemplated embodiments, the video display 122*a* may be, for example, a touch screen display (e.g., a capacitive touch screen display) allowing the player to provide game inputs and make game selections in an interactive manner. The screen displays generated on the video display 122*a* are synchronized in the example shown with a main screen video display 104 to provide an intuitive, yet immersive game play experience to a player seated on the gaming chair 102.

In some cases, however, the video display 122*a* may be coordinated with the input/output elements 124*a*, 124*b* to fully play a game via the video display 122*a* using only the gaming hardware and peripheral elements provided on and in the gaming chair 102. In such a manner, the gaming chair 102 may be a fully functional gaming machine without requiring additional secondary game elements such as those described above.

Also in the exemplary gaming chair 102, a second video display 122*b*, which may be a touchscreen display, is shown affixed to the rear side of the backrest 188. The second video display 122*b* may be used, for example, passively or interactively for signage purposes, to attract players to the game via display of simulated game action video, to display an actual game in action for observers to see from a vantage point behind the gaming chair 102, or for other gaming facility purposes such as advertising, product or game promotions, previews, to display maps and information of a facility or area attractions, restaurant menus and hours, general announcements and information, or other desired information and graphics. The second video display 122*b* may also be used for interactive competitive or cooperative play by a second player against or with the first player seated in the gaming chair 102 and using the first video display 122*a* or via the secondary main video display 104.

The gaming chair 102 is shown attached to a game deck 200 at a selected distance from a stand or pedestal 202 that supports a secondary gaming element in the form of main video display 104 in an elevated position with respect to the game deck 200 and the gaming chair 102. When a player is sitting in the gaming chair 102, the main display 104 is partly at eye level and extends above the gaming chair 102 and the player to provide an immersive game experience.

In various different embodiments, the main display 104 may be, a liquid crystal display (LCD), a light emitting diode (LED) display, a plasma screen display, or any other suitable video display unit providing a desired picture and resolution for the game being played. The main display 104 is shown as a curved video display to further enhance player immersion in the game, and the pedestal 202 is shaped to provide an adequate clearance for ingress and egress for the player to enter or leave the gaming chair 102. Combinations of different displays of the same or different types and or the same or different sizes and configuration (e.g., flat or curved) may also be provided. Because the video display 122*a* in the gaming chair 102 is a touch screen display, the main display need not be a touch screen display and cost savings may result in providing the main display. If desired, however, the main video display 104 may be a touch screen display as well.

The main display 104 is mounted to the pedestal 202 as shown in a manner that is generally unrestricted on its top, bottom and side edges. As such, not only does the main display 104 appear to float in front of the game player seated on the gaming chair 102, but additionally and different types of video displays may easily be accommodated because of the unrestricted space around the main display. Different types of video displays may be mounted to the pedestal 202 at the time of initial manufacture and assembly of the game machine or system, or much later in the life cycle of the main video display to refresh a game machine or system for further use, adopt newer display game technologies, or adapt the game machine or system for use to play a different game.

For example, the main display 104 shown is curved about a vertical axis, while another main display having a curvature about a horizontal axis can easily be attached to the same pedestal 202, even if the height and width dimensions of the display are different, and perhaps significantly different from one another. Combinations of main displays 104 may be mounted adjacent one another in a landscape or portrait-type orientation, whether flat screens or curved screens to provide an enhanced viewing area to a player. For example, two 82 inch curved monitors may be provided in front of the gaming chair 102 to provide a video wall in front of the player seated on the gaming chair 102.

Likewise, flat screens of various sizes are likewise easily accommodated via the open design of the pedestal 202 that is possible by the virtue of the gaming chair 102 including the operative gaming components and player interface hardware described. Additionally and advantageously, various different shapes, sizes and configurations of other secondary gaming elements such as those mentioned above may likewise be provided in combination with the gaming chair 102 in a highly versatile manner to provide other variants of gaming machines.

The pedestal 202, relative to conventional customized game machine cabinets that would include a similar main display 104, is much smaller and simpler as it generally need not include the game component hardware elements and player interface hardware elements that are incorporated and built-in to the design of the gaming chair 102 instead. The pedestal 202 beneficially realizes material costs savings and assembly savings from a manufacturing perspective. In the example shown, the pedestal 202 in its width dimension is much smaller than the main video display 104 that it supports, such that the main video display 104 is more visually prominent and enhanced game immersion experiences are possible. It is recognized that in embodiments including wall-mounted main video displays 104 the pedestal 202 may be considered optional and need not be provided.

Figure 16:
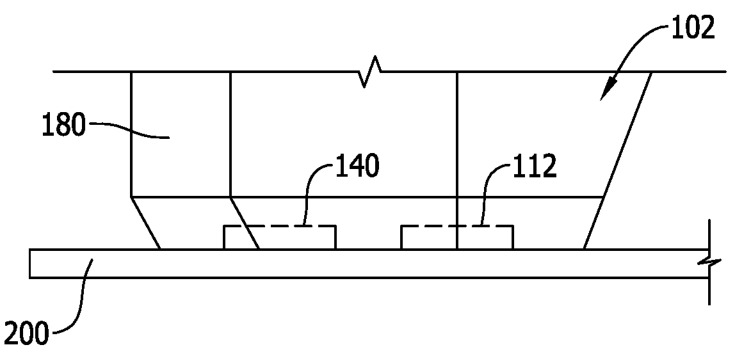
FIG. 16 is a partial side view of a gaming chair in a game play game play position.
Figure 17:
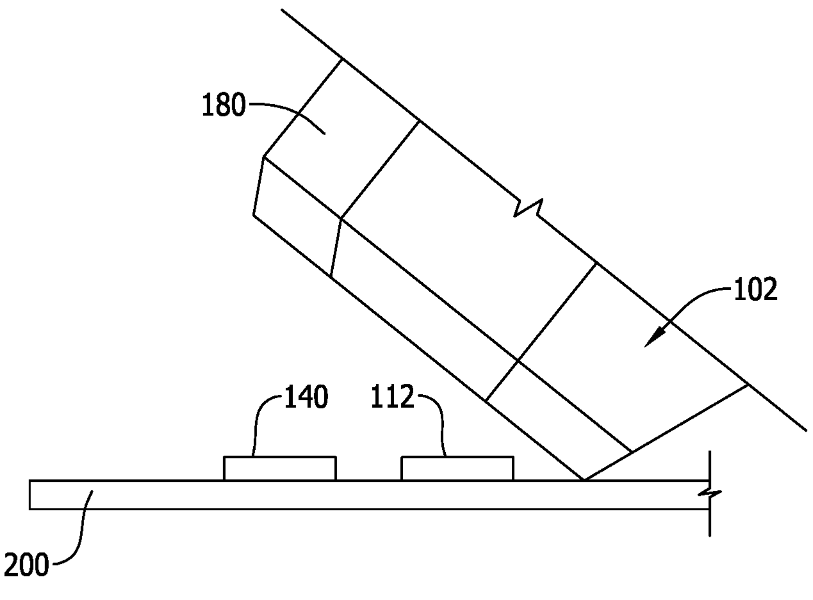
FIG. 17 is a partial side view of a gaming chair in a game controller service position.

The game controller 140, and also the power supply unit 112, in contemplated examples is located inside the gaming chair base 180 of the gaming chair 102 in a game play position as further illustrated in FIG. 16. In the game play position, the game controller 140 and power supply or fully enclosed and protected inside the gaming chair base 180, such that gaming chair base serves as a protective housing for the game controller 140 and the power supply 112. In a contemplated embodiment, the gaming chair base 180 may be rotatably mounted to the game deck 200 on or near its front edge facing the pedestal 202, and as shown in FIG. 17 the base 180 may be rotated relative to the game deck 200 in a forward direction to provide service access to the game controller 140 or power supply 112 underneath the chair base for inspection, maintenance and repair, or even replacement. As such, the gaming chair 102, and more specifically the base 180 of the gaming chair 102, is selectively positionable related to the game deck 200 between the game play position enclosing the game controller 140 and power supply 112 and a service position allowing access to the game controller 140 and the power supply 112. The gaming chair 102 remains attached to the game deck 200, however, in each of the game play position and the service position. Locking features and the like are also contemplated such that only authorized persons are permitted to move the gaming chair 102 to the service position.

In another embodiment, the gaming chair 102 may be removable from the game deck 200 to provide service access to the game controller 140 or the power supply unit 112. The game controller 140 and/or the power supply unit 112 may likewise be accessible in a slide-out drawer, or accessed via a door or opening such that the gaming chair 102 need not be rotated or removed in order to service the game controller 140. Numerous variations are possible in this regard. Also, the game controller 140 and/or the power supply 112 need not be located in the base 180 of the gaming chair as described above, but instead may be located elsewhere in the gaming chair structure as desired (e.g., in the seat, the backrest, an arm rest or an appendage as described above), with the gaming chair structure serving as a housing for the game controller 140 and power supply 112. Housing the game controller 140 in the structure of the gaming chair 102 beneficially allows for a simpler pedestal structure and eliminates a need for a conventional customized gaming machine cabinet.

In some embodiments, the gaming chair 140 may also be selectively positionable relative to the game deck 200 at the option of a player to position the gaming chair 102 closer to or further away from the pedestal 202. Likewise, the pedestal 202 may be slidably mounted to the game deck 200 or otherwise be adjustable in position relative to the gaming chair 102 when desired.

While an exemplary pedestal 202, main display 104, gaming chair 102 and game deck 200 is shown in FIGS. 2-4, it is recognized that different gaming chair configurations, different video displays, different pedestals and different decks could likewise be utilized in other embodiments to realize different game effects. For example, and as mentioned above the main video display 104 may have different curvature or may be a flat screen display. Different pedestals 202 may be used with the same or different displays or alternative secondary gaming elements. The game deck 200 as shown is a substantially planar and rectangular element, although it may alternatively assume various different geometries, and may include a multi-level, non-planar surface for either aesthetic or functional reasons. In some cases, the game deck 200 could be considered optional and need not be provided. The gaming chair 102 and the pedestal 202 could be freestanding elements and/or anchored in place on a game floor in another manner if desired.

Speakers 120 may be provided proximate the upper end of the backrest 188 in the gaming chair 102 such that the speakers are proximate a player's ears when the player sits in the gaming chair 102. Also, speakers may be provided in the pedestal 202 as desired. Combinations of speakers 120 at various different locations relative to the player may enhance game play and immersive game experience.

The gaming machine or system 100 may be utilized in a standalone manner or in game bank configurations such as those described below including different numbers of gaming chairs, pedestals, and main displays. The video display 104 and the video display 122*b* in the gaming chair 102 beneficially provide electronic signage capability that does not depend on a conventional cabinet signage. The hardware devices integrated in the gaming chair 102, as opposed to a custom cabinet, allows the devices to be used with virtually any type of main display 104 or any other secondary gaming element desired in a modular form of assembly as described below. The pedestal 202 may easily accommodate different types of main displays, and different pedestals 102 may be utilized with the gaming chair 102 to accommodate different displays in a relatively low cost manner, while still using the same gaming chair 102. The game deck 200 can likewise be provided in many different shapes and configurations to achieve substantially different effects with the same gaming chair 102 or a plurality of gaming chairs 102. The gaming chair 102, including local power supply units 112, the game controller(s) 140 and the applicable game engine, may also assume substantially different appearances while utilizing essentially the same hardware gaming components.

Because the gaming chair 102 includes the same hardware gaming components, after the gaming chair 102 initially receives regulatory approval new games including the gaming chair 102 may receive regulatory approval in a much shorter timeframe than a conventional game including a new gaming machine cabinet with new hardware gaming components. In the example shown in FIGS. 2-4, for example, the touch screen interface 122*a* may be modified (or replaced) to implement a new game, while all the other hardware components in the gaming chair remain the same. The new interface 122*a* must be tested and pass compliance requirements in the gaming industry, but the rest of the hardware components in the gaming chair 102 that have been approved previously results in about a ⅔ reduction in time needed to obtain a regulatory approval for a new game including the gaming chair 102. Also, a new game including the gaming chair can be developed with 50% to 75% cost savings as the engineering costs of the gaming chair 102 need not be recurred when developing another game that includes the gaming chair.

Figure 5:
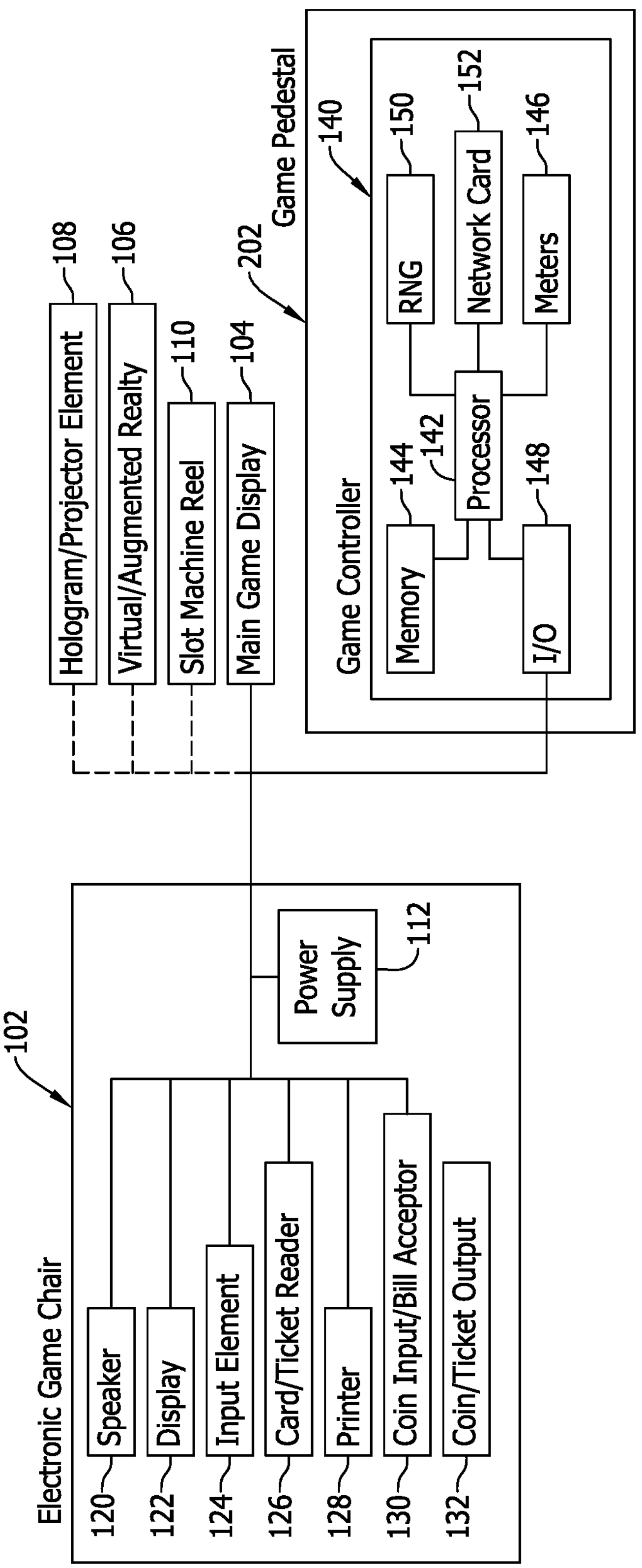
FIG. 5 schematically illustrates a second embodiment of an electronic gaming machine and system including gaming hardware components integrated in a gaming chair and in a pedestal.

FIG. 5 is another schematic illustration of a gaming machine and system having the same hardware components shown in FIG. 1, but with some of those hardware components integrated into or built into the design of the pedestal 202 and others of the components integrated into or built into the design of the gaming chair 102. In the example shown, the game controller 140 is housed in the game pedestal while the power supply unit 112 and the player interface hardware elements 120, 122, 124, 126, 128, 130, 132 are integrated into the structure of the gaming chair 102. Similar benefits may ensue in that the custom cabinet design is avoided in favor of a pedestal and gaming chair design that may be more suitably used with various different types of main displays.

Figure 6:
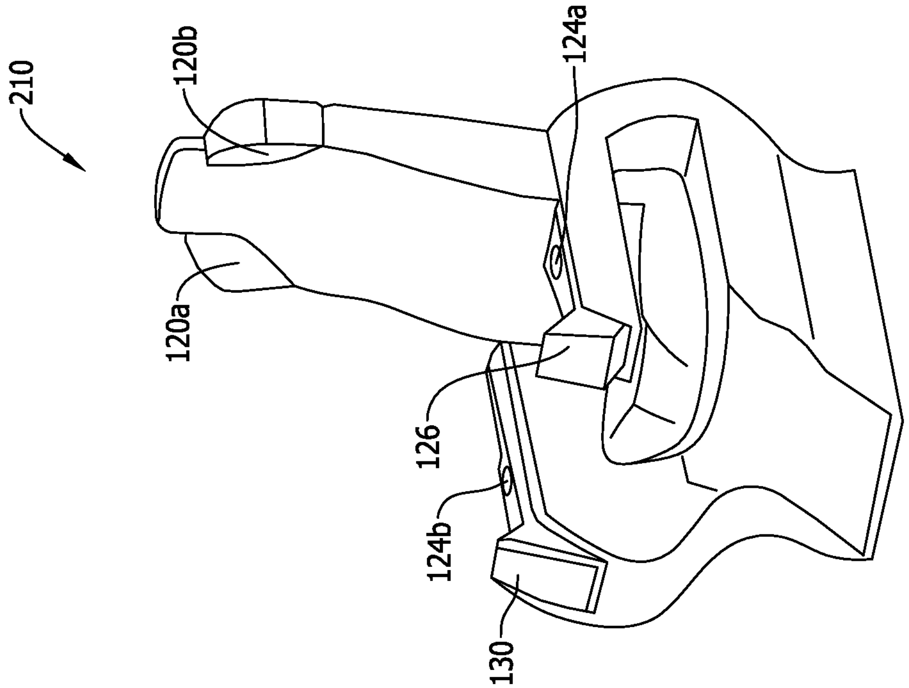
FIG. 6 is a perspective view of a second exemplary embodiment of a gaming chair for the machine and system shown in FIG. 1 or 6.

FIG. 6 is a perspective view of another example of a gaming chair 210 having some of the player interface hardware elements distributed on the arm rests and backrest with alternative gaming chair structure. The game controller 140 may be located in the base of the gaming chair as described above, or the hardware elements provided on the gaming chair 210 may communicate with an external game controller as desired. Unlike the gaming chair 102 described above with a rotatable arm rest to provide unobstructed access to the seat, the gaming chair 210 includes fixed position arm rests on both sides, while still providing an inviting approach and access to a player. The gaming chair 210 may be provided as a modular component for assembly into a variety of different game bank configurations as described next.

Figure 7:
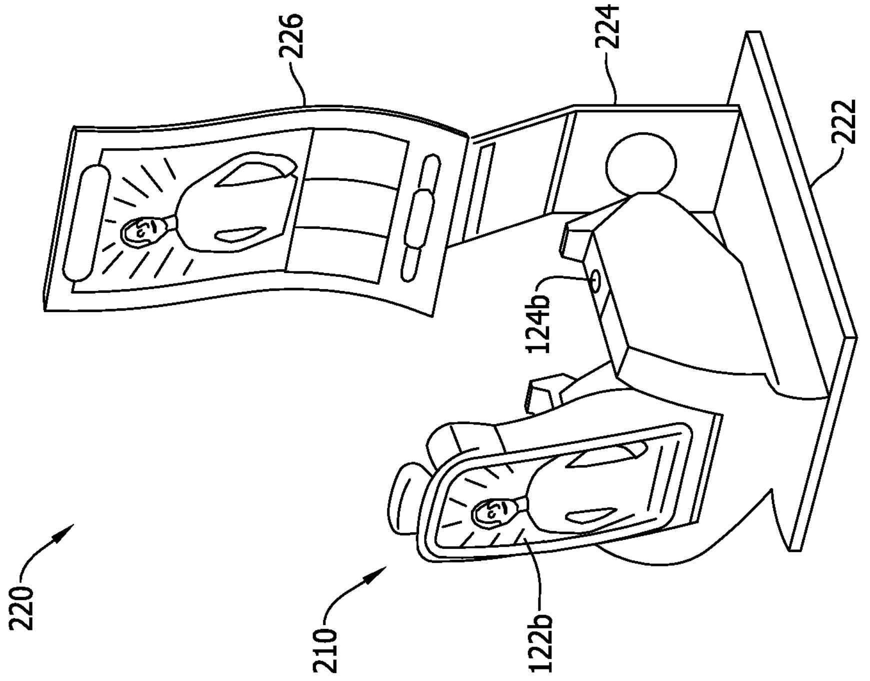
FIG. 7 is a perspective view of the gaming chair shown in FIG. 6 in a first exemplary embodiment of a game bank configuration.
Figure 8:
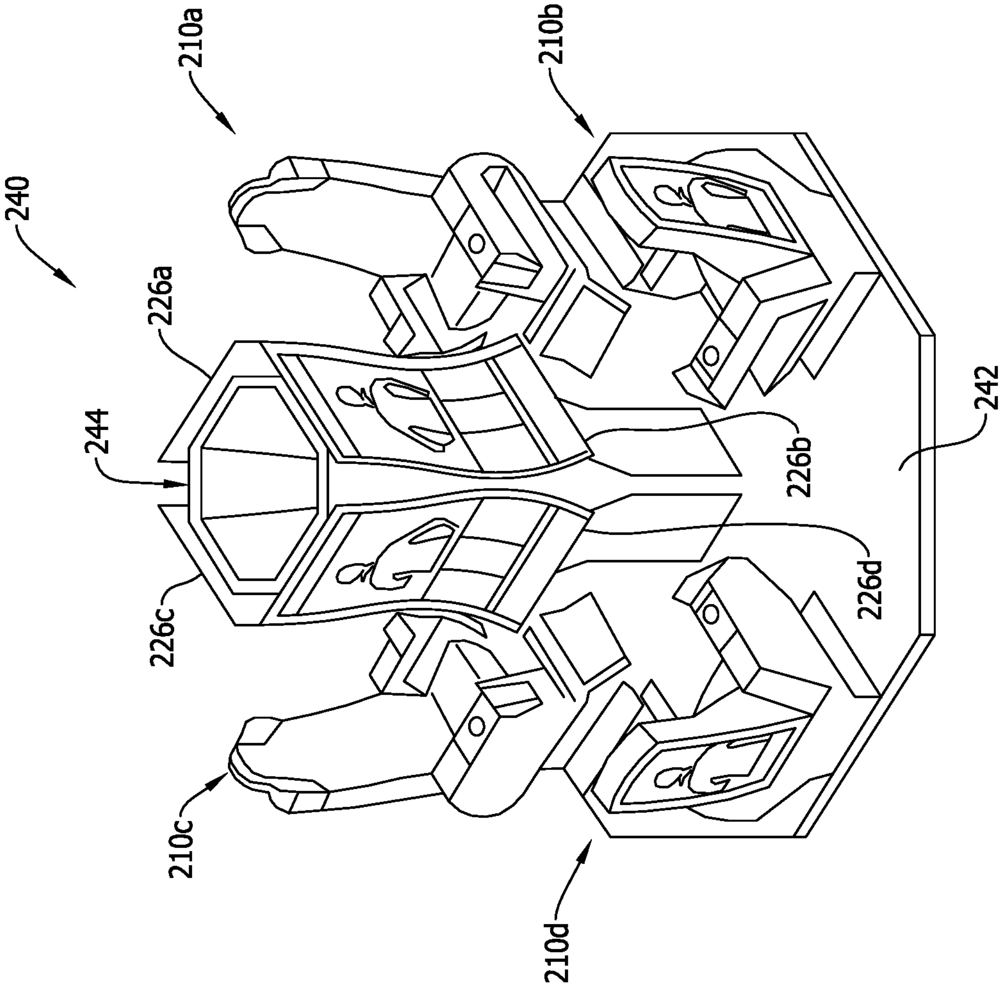
FIG. 8 is a perspective view of gaming chairs shown in FIG. 6 in a second exemplary embodiment of a game bank configuration.
Figure 9:
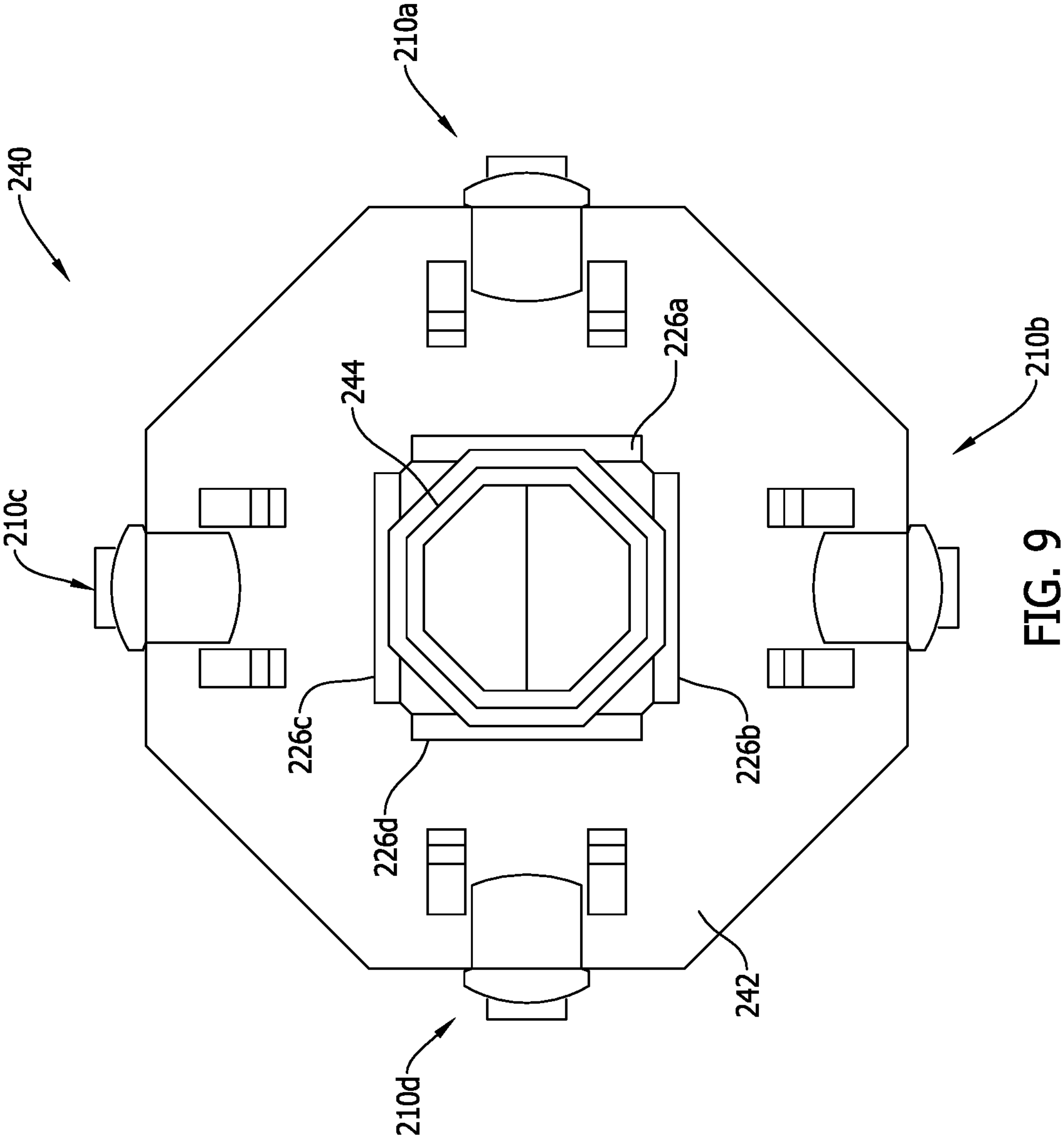
FIG. 9 is a top perspective view of the game bank configuration shown in FIG. 8.
Figure 10:
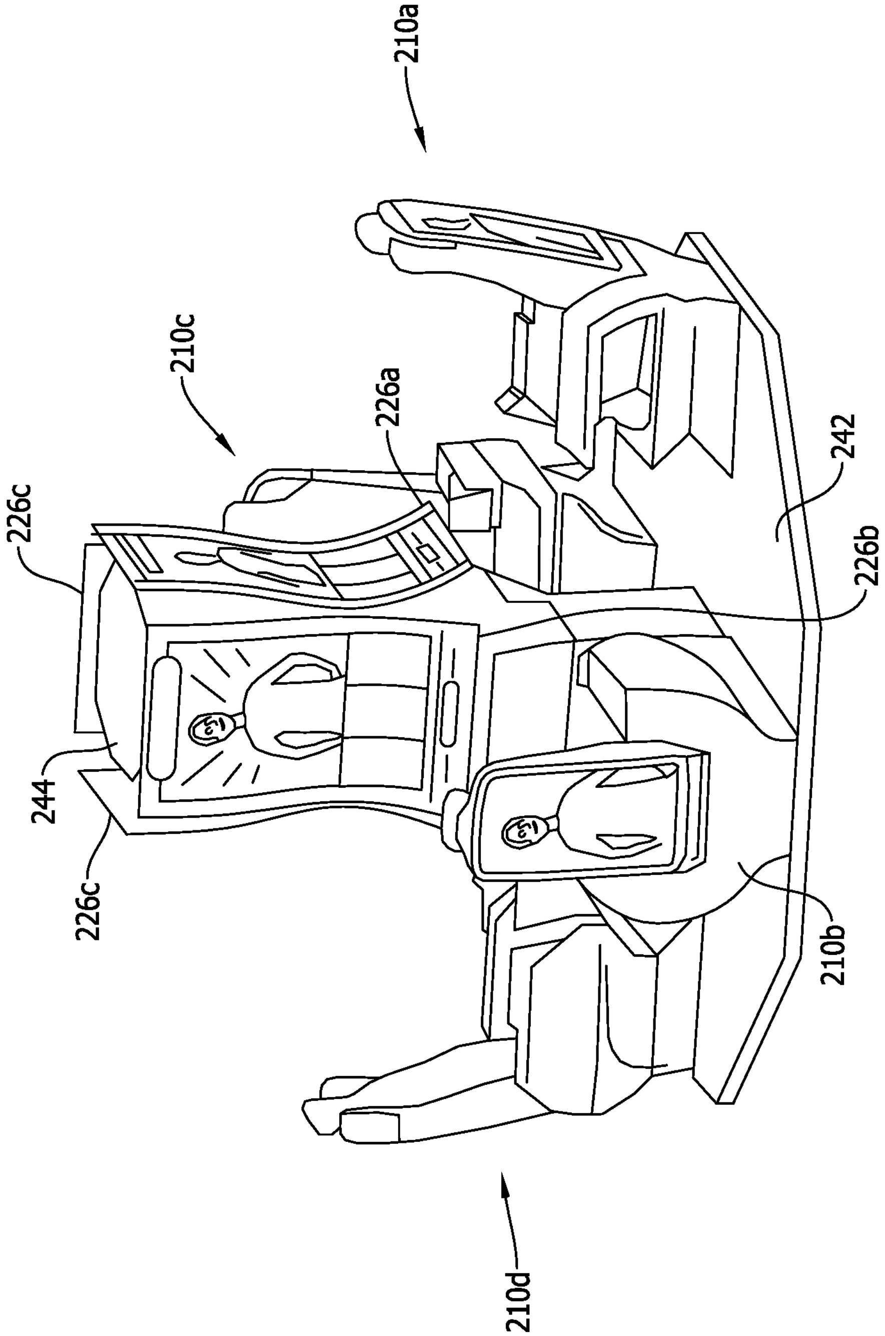
FIG. 10 is another perspective view of the game bank configuration shown in FIG. 8.

FIG. 7 shows the gaming chair 210 in a first exemplary embodiment of a game bank configuration 220 including a deck 222, a pedestal or stand 224 and a main display 226 supported on the stand 224. A single gaming chair 210 and a single main display 224 are provided. More than one gaming chair 210 could be provided with the single main display 224, or multiple gaming chairs and displays may be provided as in the following game bank examples. Also, more than one main display 224 could be provided with a single gaming chair 210, FIG. 8 is a perspective view of gaming chairs 210 in a second exemplary embodiment of a game bank configuration 240. The game bank configuration 240 includes a deck 242, four gaming chairs 210*a*, 210*b*, 210*c*, 210*d* and a centrally located stand 244 that supports four main displays 226*a*, 226*b*, 226*c*, 226*d* respectively situated in front of each respective gaming chair 210*a*, 210*b*, 210*c*, 210*d*. The gaming chairs 210*a*, 210*b*, 210*c*, 210*d* are shown extending about the stand 244 and are mounted to the deck 242 at about 90° positions from one another on the surface of the deck 242 as further shown in FIGS. 9 and 10. Of course, greater or fewer numbers of gaming chairs may be provided in alternative embodiments at different angular positions and orientations relative to one another.

In the example shown, the gaming chairs 210*a*, 210*b*, 210*c*, 210*d* are arranged inwardly to face the center of the game bank wherein stand 244 and the main displays 226*a*, 226*b*, 226*c*, 226*d* are located. In another embodiment, the gaming chairs 210*a*, 210*b*, 210*c*, 210*d* may be arranged in the center of the game bank such that players seated on each gaming chair look outwardly toward main displays 226*a*, 226*b*, 226*c*, 226*d* on the periphery of the game bank to achieve different gaming effects or different appeal to various gaming communities. The deck 242 and the stand 244 in the illustrated example are each seen to have an octagonal profile accommodating the main displays 226*a*, 226*b*, 226*c*, 226*d* and the gaming chairs 210*a*, 210*b*, 210*c*, 210*d* in the arrangement shown. Other profiles of the deck 242 and the stand 244 may be utilized to accommodate greater or fewer gaming chairs and displays.

Also, in contemplated embodiments each respective one of the main displays 226*a*, 226*b*, 226*c*, 226*d* is powered by the respective local power supply unit in the respective gaming chairs 210*a*, 210*b*, 210*c*, 210*d*. A one-to-one correspondence between gaming chairs and main displays is not necessary in all embodiments, however, as a local power supply unit 112 in one of the gaming chairs could be used to power an additional one of the gaming chairs or an additional one of the main displays. In other words, not all of the gaming chairs need include a local power supply unit 112 but may instead be connected to a power supply unit of another gaming chair in the game bank. Higher capacity power supply units 112 in some of the gaming chairs may result in increased costs for the gaming chairs including them, but such costs may be offset by eliminating local power supply units 112 in other ones of the gaming chairs. In some embodiments, one of the gaming chairs has a power supply unit 112 with sufficient capacity to power the entire game bank (i.e., each of the additional gaming chairs and each secondary game element provided in the game bank).

Figure 11:
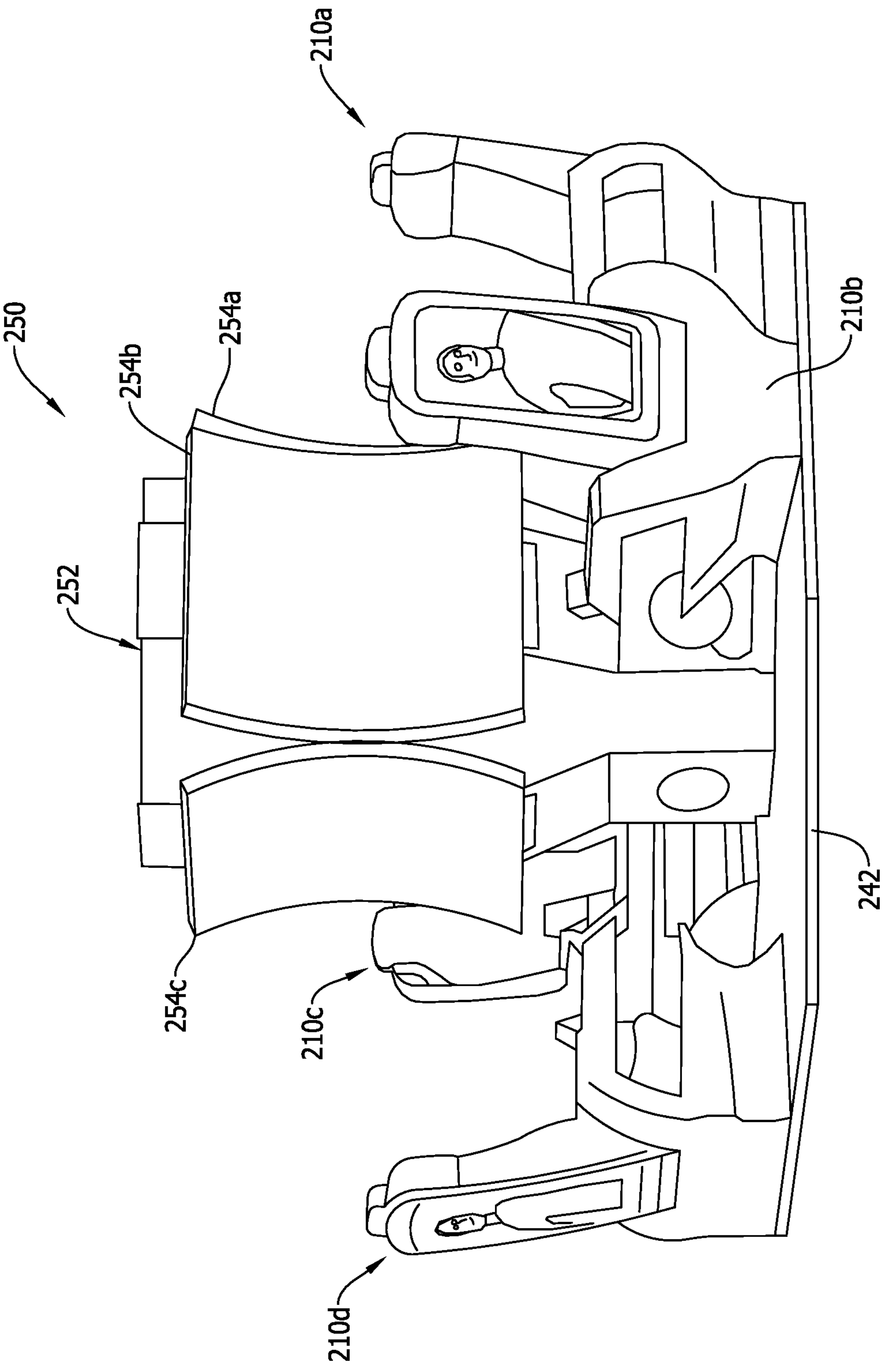
FIG. 11 is a perspective view of gaming chairs in a third exemplary embodiment of a game bank configuration.

FIG. 11 is a perspective view of gaming chairs 210*a*, 210*b*, 210*c*, 210*d* in a third embodiment of a game bank configuration 250. The game bank configuration 250 is similar to the game bank configuration 240 shown in FIGS. 8-10 in that it in includes four gaming chairs 210*a*, 210*b*, 210*c*, 210*d* positioned about 90° from one another, but a larger stand structure 252 is provided in the center of the deck 242 to accommodate relatively larger main display screens 254*a*, 254*b*, 254*c*, 254*d*. FIGS. 8-11 illustrate the configurability of different exemplary main displays with the same exemplary gaming chairs to achieve different effects. Specifically, the gaming chairs can be retrofitted with newer displays as desired or as needed with relative ease on the pedestal structure. If needed, a new pedestal structure can be provided and easily attached to the deck in a relatively low cost manner to facilitate new displays or to accommodate alternative secondary game elements.

Figure 12:
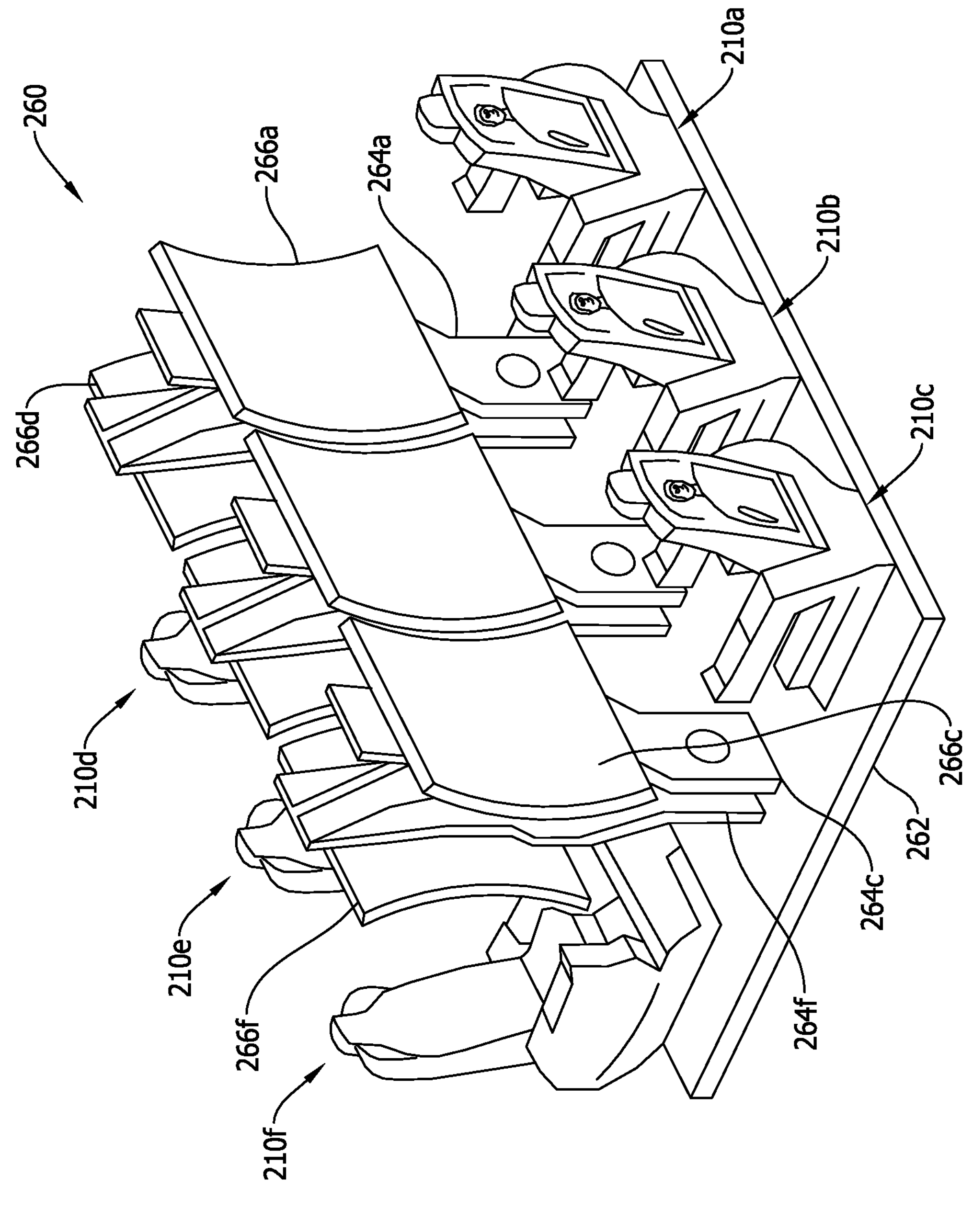
FIG. 12 is a perspective view of gaming chairs in a fourth exemplary embodiment of a game bank configuration.

FIG. 12 is a perspective view of gaming chairs 210 in a fourth exemplary embodiment of a game bank configuration 260. The configuration shown in FIG. 12 shows six gaming chairs 210*a* through 210*f* aligned side-by-side in two rows of three gaming chairs each that face toward one another on a game deck 262 that is substantially rectangular. In between the rows of gaming chairs 210 is a series of stands 264*a* through 264*f* with main displays 266*a* through 266*f* oriented to face each respective gaming chair 210*a* through 210*f*. Of course, greater or fewer numbers of gaming chairs and stands are possible in an alternative embodiment.

While the illustrated example shows that stands and main displays in the center of the game bank with the gaming chairs on the periphery, in another embodiment, the gaming chairs could be located in the center of the game bank such that players look outwardly toward the stands and main game displays on the periphery of the game bank. The gaming chairs may be arranged adjacent to one another in a back-to-back arrangement or may be spaced from one another to achieve different gaming effects or different appeal to various gaming communities.

Additionally, while the gaming chairs are shown aligned in a side-by-side arrangement in FIG. 12, the gaming chairs may alternatively be arranged in spaced relation to one another in an aligned or unaligned manner at desired angles to create different vantage points. Likewise, the stands and the main game displays shown in FIG. 12 need not be aligned side-by-side as shown in the example of FIG. 12, but instead could be arranged at different positions and angular orientation to facilitate a game with a player in the game bank.

Figure 13:
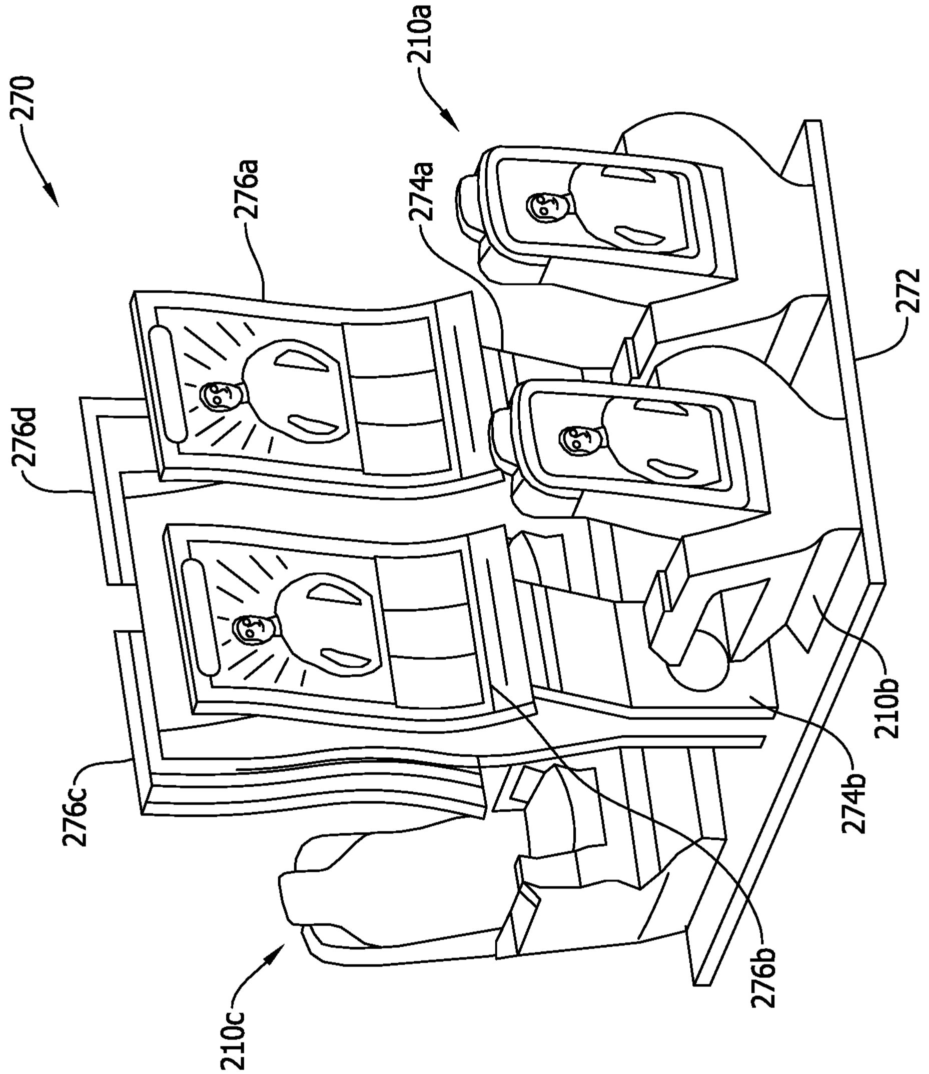
FIG. 13 is a perspective view of gaming chairs in a fifth exemplary embodiment of a game bank configuration.

FIG. 13 is a perspective view of gaming chairs 210 in a fourth exemplary embodiment of a game bank configuration 270. The game bank configuration 270 includes four gaming chairs 210*a* through 210*d* aligned side-by-side in two rows of two gaming chairs apiece that face toward one another on a deck 272. In between the rows of gaming chairs is a series of stands 274*a* through 274*d* with main displays 276*a* through 276*d* oriented at each respective gaming chair 210*a* through 210*d*. The game bank configuration 270 may be recognized as similar to the game bank configuration 260 but including fewer gaming chairs, stands and main game displays. Similar variations to those described above with respect to the game bank configuration 260 are possible in the game bank configuration 270 to create different experiences for particular games and gaming communities.

Figure 14:
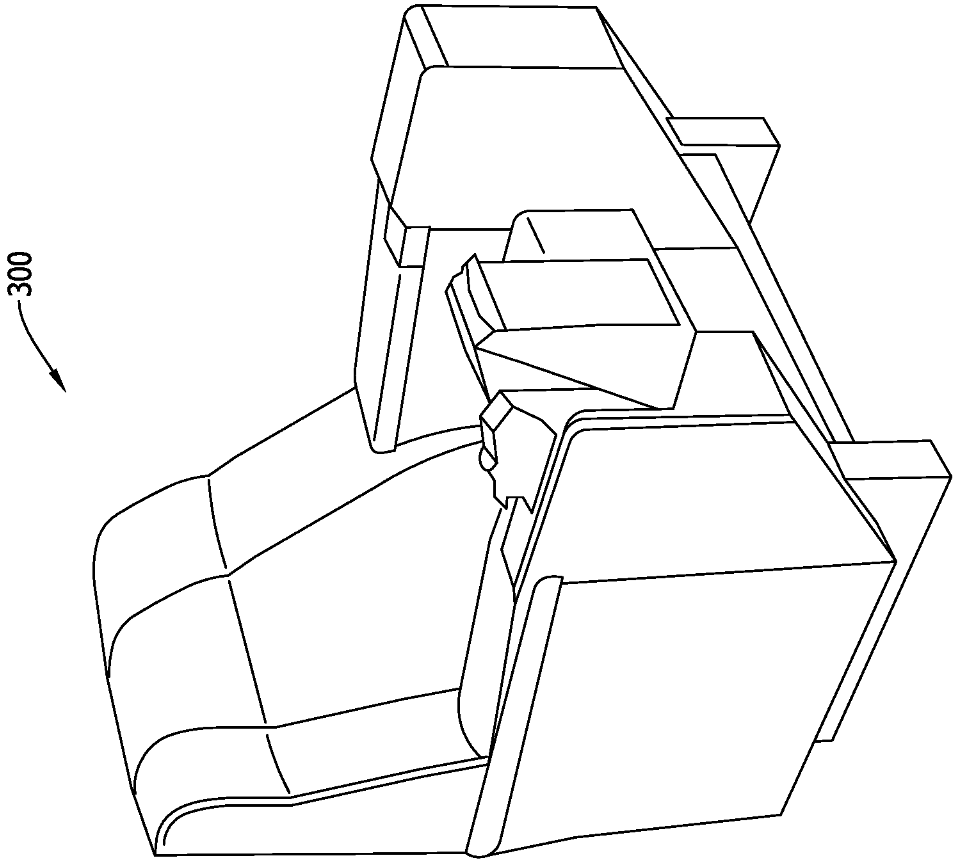
FIG. 14 is a perspective view of a third exemplary embodiment of a gaming chair for the electronic gaming machine and system shown in FIG. 1 or 6.

FIG. 14 is a perspective view of another exemplary embodiment of a gaming chair 300 for gaming machines and systems such as those described above in relation to FIG. 1 or 6 and in various different game bank configurations such as those described above in relation to FIGS. 7-13. The gaming chair 300 includes game player interface hardware elements as discussed above that eliminates a need for an expensive, customized game machine cabinet. In the gaming chair 300, appendages are provided to both arm rests to house some of the player interface hardware. The gaming chair 300 has a markedly different appearance than the gaming chairs 102, 210 described above. The gaming chair 300 may be used as a standalone gaming machine or in combination with another gaming element in a gaming system. Various different game bank configurations are possible.

Figure 15:
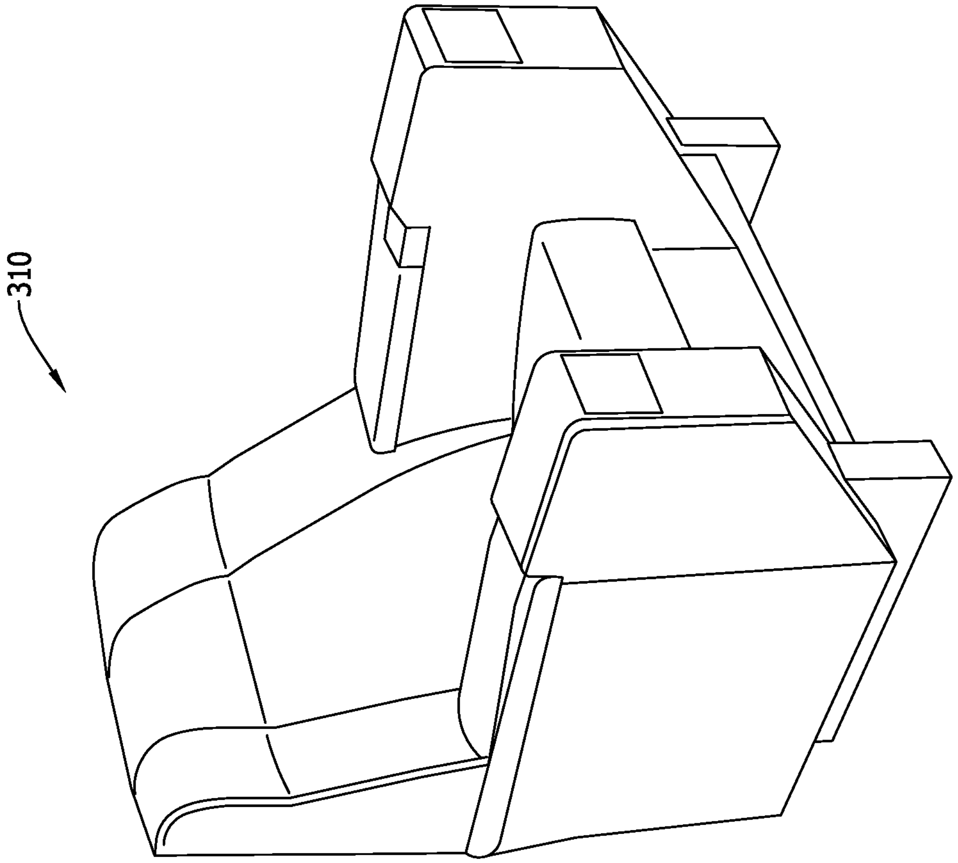
FIG. 15 is a perspective view of a fourth exemplary embodiment of a gaming chair for the electronic gaming machine and system shown in FIG. 1 or 6.

FIG. 15 is a perspective view of another exemplary embodiment of a gaming chair 310 for gaming machines and systems such as those described above in relation to FIG. 1 or 5 and in various different game bank configurations such as those described above in relation to FIGS. 7-13 as a further illustration of the versatility of integrating player interface hardware in the gaming chair design with a markedly different appearance that the gaming chairs 102, 210 and 300 but with otherwise similar function and capability.

While exemplary gaming chairs, main displays and game bank configurations are described, still other gaming chairs, main displays and game banks are possible. Different types of gaming chairs may be used in the same game bank or in different game banks. Different types of gaming chairs may be also be mixed and matched with different stands and displays to create a large number of visually different game presentations using a limited number of modular parts. For example, in an exemplary scenario wherein four models of gaming chairs are available and a four chair game bank is desired, sixteen different game bank configurations are available from just the seating perspective. If three different types of pedestals and three sizes of screen displays are also made available for a four chair game bank, this means that there are 36 possible game bank configuration options. All of these options may be assembled on the same deck, or if different deck options are made available then still further game bank configuration options are presented as demonstrated in the exemplary game banks described above.

In certain embodiments, game decks could be attachable to one another to define still further variations in game banks and create different game presentations and impressions. For example, if the game decks shown in FIG. 8 were attached side-by-side a two chair game bank configuration may be realized. As another example, if the game deck shown in FIG. 14 was attached to another similar game deck, an eight chair game bank configuration may be realized. Likewise, the six chair game configuration shown in FIG. 13 may be realized via a combination of six of the decks shown in FIG. 8, or via a combination of the four chair deck of FIG. 14 and two of the decks shown in FIG. 8.

Otherwise similar game decks and gaming chairs may be provided in different styles and colors to be mixed and matched to provide still further opportunities to offer distinct game machines, systems and game bank configurations while using a limited set of modular parts. As desired, game systems and game bank configurations may be easily modified and refreshed to include gaming chairs of different types, chairs of different colors, different pedestals of different types or colors, different deck shapes or deck colors, or replacement of the main displays with a newer state of the art display well after the game bank originally supplied. The game banks may be expanded to include more gaming chairs and main displays, or game banks may be reduced to include fewer numbers of gaming chairs depending on the popularity of the games presented. Plug and play type connection of the hardware devices in the gaming chairs and pedestals or stands allow for rapid assembly, re-assembly, configuration and re-configuration of gaming machine features, gaming system adaptations, and any desired updates or refreshment with ease. Longer life spans of gaming machines/systems may result, with increased opportunity to provide customized gaming experiences at substantially reduced cost.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive. Several embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings. It will be understood that the invention disclosed and defined in this specification extends to all alternative combinations of two or more of the individual features mentioned or evident from the text or drawings. All of these different combinations constitute various alternative aspects of the invention.

The present invention contemplates methods, systems and program products on any electronic device and/or machine-readable media suitable for accomplishing its operations. Certain embodiments of the present invention may be implemented using an existing computer processor and/or by a special purpose computer processor incorporated for this or another purpose or by a hardwired system, for example.

Embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

In view of the description above, the programming of the controller(s) to realize the benefits and functionality described above is believed to be within the purview of those in the art and is accordingly not further described.

In the claims which follow and in the preceding disclosure, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the disclosure.

It will be understood to persons skilled in the art of the invention that many modifications may be made without departing from the spirit and scope of the disclosure.

The invention claimed is:

1. A gaming machine comprising:

a gaming chair comprising:

a chair body comprising a chair base and a seat supported by the chair base;

a plurality of player interface hardware elements coupled to the chair body and accessible by a player seated on the seat for providing a game play input;

a game controller positioned inside the chair body and coupled in communication with the plurality of player interface hardware elements, the game controller including a processor that executes game play instructions in accordance with game play inputs, executes game play rules and outputs game play outcomes; and a power supply unit positioned inside the chair body;

a game deck extending from the chair base of the gaming chair;

a pedestal positioned on the game deck and spaced from the chair base; and a main display supported on the pedestal, the main display being coupled in communication with the game controller to display the game play outcomes output by the game controller, the main display further being coupled to the power supply unit by an electrical connector extending from the chair body, through the game deck, and into the pedestal, the power supply unit providing power to the main display.

2. The gaming machine of claim 1 further comprising a display connector extending from the chair body, through the game deck, and into the pedestal for coupling the main display in wired communication with the game controller.

3. The gaming machine of claim 1, wherein the gaming chair and the pedestal are each attached to the game deck.

4. The gaming machine of claim 1, wherein at least one of the gaming chair and the pedestal is slidably mounted to the game deck to adjust a distance between the gaming chair and the main display.

5. The gaming machine of claim 1, wherein the pedestal is sized to support the main display vertically above the game deck at least partly at an eye level of a player seated in the gaming chair.

6. The gaming machine of claim 1, wherein the power supply unit is an uninterruptable power supply unit.

7. The gaming machine of claim 1, wherein the power supply unit provides power to each of the game controller, the plurality of player interface hardware elements, and the main display.

8. The gaming machine of claim 1, wherein the game deck is attachable to an adjacent game deck to provide a plurality of game bank configurations.

9. The gaming machine of claim 1, wherein the main display includes at least one of a video display, a virtual reality component, an augmented reality component, a hologram component, a projector element or a slot machine reel.

10. The gaming machine of claim 1, wherein the plurality of player interface hardware elements is selected from the group of: a speaker, a video display, an input/output element, a card and/or ticket reader, a printer, a bill acceptor and/or coin input mechanism, and a coin or token output mechanism.

11. The gaming machine of claim 1, wherein the gaming chair further comprises an access door for providing access to the game controller.

12. The gaming machine of claim 1, wherein the power supply unit is configured to provide power to a second game controller of a second gaming chair.

13. A gaming machine comprising:

a gaming chair comprising:

a chair body comprising a chair base and a seat supported by the chair base;

a plurality of player interface hardware elements coupled to the chair body and accessible by a player seated on the seat to provide a game play input; and a game controller positioned inside the chair body and coupled in communication with the plurality of player interface hardware elements, the game controller including a processor that executes game play instructions in accordance with game play inputs, executes game play rules and outputs game play outcomes; and a power supply unit positioned inside the chair body for providing power to the plurality of player interface hardware elements and the game controller;

a pedestal spaced from the gaming chair; and a secondary gaming element supported on the pedestal and coupled in communication with the game controller to display the game play outcomes output by the game controller, wherein the power supply unit is electrically coupled to the secondary gaming element by an electrical connector extending from the chair body and into the pedestal, wherein the power supply unit is configured to provide power to an adjacent game controller of an adjacent gaming chair.

14. The gaming machine of claim 13, wherein the secondary gaming element is a main video display, the gaming machine further comprising a game deck extending between the gaming chair and the pedestal, wherein the gaming chair and the pedestal are each attached to the game deck.

15. The gaming machine of claim 14, wherein the pedestal is sized to support the main video display vertically above the game deck and at least partly at an eye level of a player seated in the gaming chair.

16. The gaming machine of claim 13, wherein the power supply unit is configured to provide power to the secondary gaming element.

17. The gaming machine of claim 13, wherein the power supply unit is an uninterruptable power supply unit.

18. The gaming machine of claim 13, wherein the plurality of player interface hardware elements is selected from the group of: a speaker, a video display, an input/output element, a card and/or ticket reader, a printer, a bill acceptor and/or coin input mechanism, and a coin or token output mechanism.

19. A method for assembling a gaming machine comprising:

providing a gaming chair including a chair body, a plurality of player interface hardware elements incorporated into the chair body for providing game play inputs, a game controller positioned inside the chair body that is operable to execute game play instructions in accordance with game play rules and output game play outcomes, the gaming chair further including a power supply unit positioned inside the chair body;

providing a main display on a pedestal;

positioning at least one of the pedestal and the gaming chair to be spaced from the other of the pedestal and the gaming chair;

providing a game deck extending between the gaming chair and the pedestal, the pedestal being positioned on the game deck;

coupling the game controller in communication with the main display and the plurality of player interface hardware elements to display the game play outcomes output by the game controller on the main display; and coupling an electrical connector to the power supply unit and the main display, where the electrical connector extends from the chair body, through the game deck, and into the pedestal, the power supply unit providing power to the main display.

* * * * *